United States Patent Office 3,262,312
Patented July 26, 1966

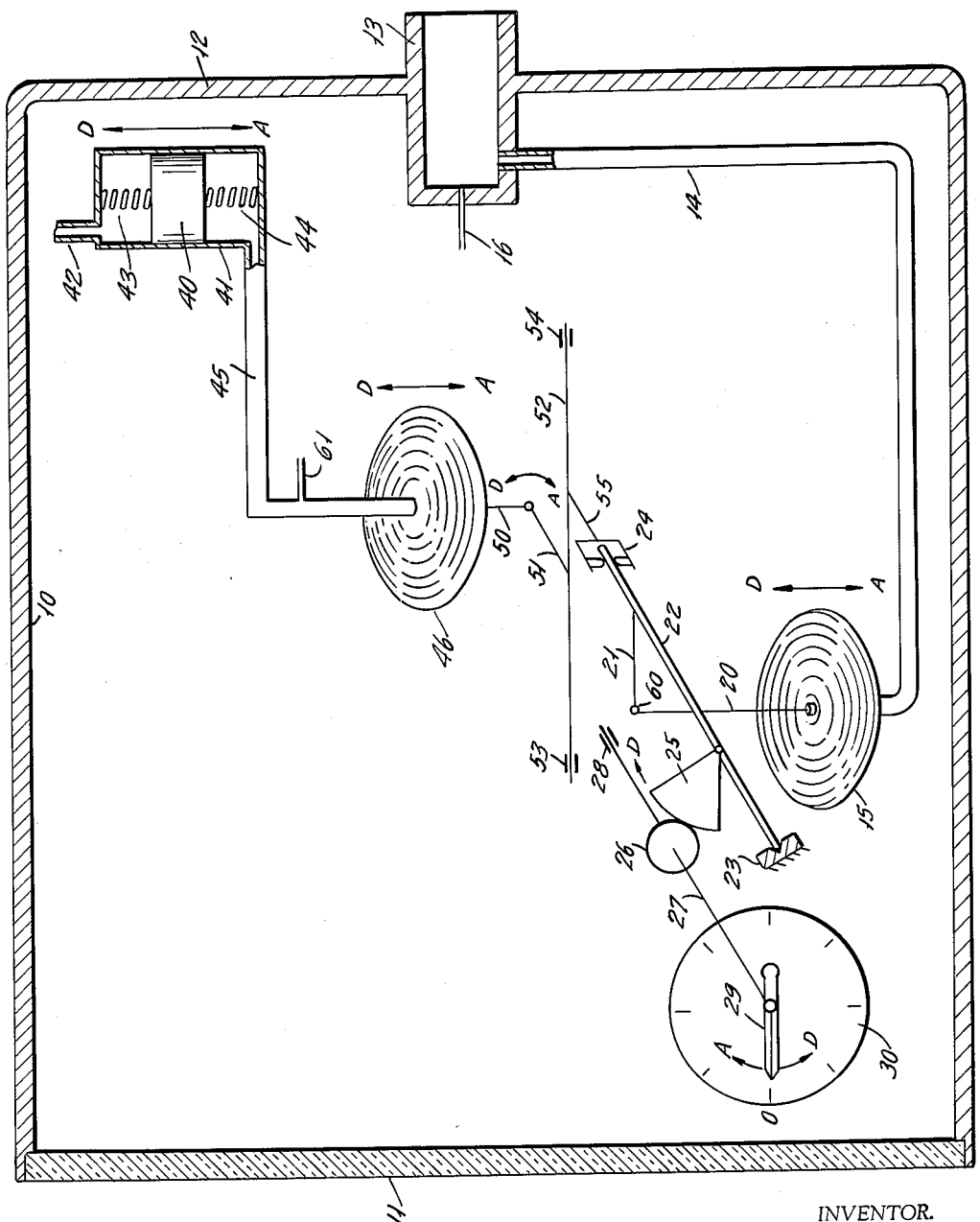

3,262,312
VERTICAL VELOCITY INDICATOR
Walter Angst, Douglaston, N.Y., assignor to Kollsman Instrument Corporation, Elmhurst, N.Y., a corporation of New York
Filed Nov. 5, 1963, Ser. No. 321,541
6 Claims. (Cl. 73—179)

This invention relates to vertical velocity indicators, and more specifically relates to a vertical velocity indicator which has a rapid rate of response.

Pressure operated vertical velocity indicators are well known to the art. Typically, a suitable diaphragm is contained within a housing wherein the diaphragm interior is directly connected to external pressure, while the housing is connected to external pressure through a controlled leak or capillary tube. As altitude changes, the pressure applied to the diaphragm interior will change faster than the pressure surrounding the diaphragm within the housing, whereby the expansion or contraction of the diaphragm will drive a pointer to indicate vertical velocity.

The rate of response of such instruments is necessarily limited since the change in static pressure applied to the interior of the diaphragm is not instantaneous, but there is some time delay or lag inherent in the system.

In accordance with the present invention, an auxiliary compensating diaphragm is provided which is caused to expand or contract in response to vertical force applied to an inertial mass. That is to say, an inertial mass contained within the instrument will have a force applied thereto instantaneously with upward or downward acceleration of the aircraft. This mass is then formed in the manner of a piston which can cause the application of pressure to the interior of an auxiliary diaphragm which can immediately change the pointer position prior to the time that the normal rate diaphragm has responded to a change in pressure. The pressure applied to the auxiliary system by the inertial mass is then bled into the housing through a capillary so that pressure equalization occurs under constant rate of change of pressure or constant pressure conditions.

Accordingly, a primary object of this invention is to provide a novel rapid response vertical velocity indicator.

Another object of this invention is to utilize the characteristics of an inertial mass for achieving rapid response to vertical velocity change in a pneumatic indicating instrument.

Another object of this invention is to provide a high accuracy vertical velocity indicator.

These and other objects of this invention will become apparent from the following description when taken in connection with the drawing which schematically illustrates in perspective view a vertical velocity indicator formed in accordance with the invention.

Referring now to the drawing, I have indicated therein in cross-section an indicator casing 10 having a front glass 11 sealed to the left-hand end of casing 10 in an airtight manner. The front glass covers a dial face in the usual manner where, as will be seen more fully hereinafter, is schematically shown a dial face 30. The rear 12 of the indicator case 10 has a static pressure opening 13 therein which is connected to suitable static pressure measuring instruments of an aircraft. The static pressure connector 13 then has a conduit 14 extending therefrom which extends into the interior of a rate diaphragm 15. The interior of the housing or case 10 is connected to the static pressure connection 13 through a small controlled leak or capillary 16. Thus, the diaphragm 15 will expand or contract depending on whether the aircraft descends or ascends respectively by virtue of the differential pressure applied to the rate diaphragm. That is to say, during descent of the aircraft from a particular altitude, the interior of housing 10 will be at some former steady pressure. As the aircraft descends, however, the pressure applied to the interior of diaphragm 15 increases very quickly, while the pressure within housing 10 changes very slowly because of the restricted leak 16. Thus, the diaphragm 15 will expand.

In a similar manner, where the aircraft ascends, the pressure within the case 10 will be held at a relatively high level, while the pressure in conduit 14 quickly decreases. Thus, the rate diaphragm 15 will be caused to contract.

Once the aircraft assumes a steady altitude or a zero vertical velocity, the pressure within the diaphragm 10 will equalize due to leakage through capillary 16 so that a net zero force will be applied across the rate diaphragm 15, and it will assume its normal zero differential pressure position.

The diaphragm 15 is connected to a link 20 which, in turn, is pivotally connected to a crank-arm 21. Crank-arm 21 is then connected to a main rocking shaft 22 which is pivotally connected between a fixed bearing 23 and a movable bearing schematically illustrated as movable bearing 24.

Rocking shaft 22 is then rigidly secured to sector gear 25 which meshes with gear 26 which is securely mounted to handstaff 27. Handstaff 27 is then carried for rotation in suitable bearings such as bearing 28, and is secured to the pointer 29 whereby rotation of handstaff 27 causes rotation of pointer 29. Pointer 29 is then carried with respect to a suitable dial 30 which has the zero position shown. Rotation of pointer 29 in the direction indicated by arrow A indicates vertical ascent velocity, while rotation of pointer 29 in the direction indicated by arrow D indicates vertical descent velocity.

Assuming for the moment that bearing 24 is fixed, it will be seen that when the aircraft descends from a predetermined altitude, the rate diaphragm 15 will expand causing an upward movement of link 20 and a clockwise rotation of rocking shaft 22. This, in turn, causes a counterclockwise rotation of handstaff 27 and thus movement of pointer 29 in the descent direction. The speed of descent will, of course, be related to the amount of expansion of diaphragm 15 which, in turn, is related to the differential pressure of diaphragm 15. When the aircraft now reaches a new and lower level, the pressure in the interior of case 10 gradually equalizes by virtue of the capillary 16 so that the pointer 29 is brought back to zero. A similar operation occurs during ascent conditions wherein the link 20 moves downwardly so that rocking shaft 22 rotates counterclockwise, and handstaff 27 along with pointer 29 rotate clockwise in the ascent indication direction.

It will be seen that the constant corrective flow through capillary 16 regulates the operating pressure within case 10 and influences the deflection of rate diaphragm 15 such that the mechanism will interpret changes in altitude pressure in terms of vertical velocity. Once the aircraft reaches the desired altitude and is flying under level conditions, the differential pressure across the rate diaphragm 15 is equalized with the pointer 29 showing zero vertical velocity.

However, since these rate measurements are accomplished by air discharge through a capillary, that is, a differential pressure drop across a capillary with respect to time, lag is inevitable. Lag is the time delay in the indicator between exposure to a set of service conditions and the correct rate indication which these conditions represent. This shortcoming is, therefore, inherent in any rate mechanism which employs the leak principle.

The principle of the present invention is to provide a novel compensating device which is added to the standard type rate mechanism described heretofore to eliminate these erroneous indications. More specifically, and in accordance with the present invention, it is recognized that any change in altitude of the aircraft will be accompanied by an accelerating force when the change in altitude is non-uniform with respect to time.

Recognizing this, applicant provides a novel compensating mechanism which includes an inertial mass 40 which serves as a piston within the cylinder 41. The upper end of cylinder 41 is vented to the interior of chamber 10 by the conduit 42, while the mass 40 is held in a central location by means of a spring suspension system including springs 43 and 44. It is to be clearly noted that the axis of cylinder 41 corresponds to the normal vertical axis of the instrument so that vertical forces are directly applied to the mass 40.

The area of cylinder 41 below piston 40 is then connected over a conduit 45 to the interior of a compensating diaphragm 46. The compensating diaphragm 46 is, therefore, exposed to a differential pressure which is the pressure below piston or mass 40 as applied to conduit 45 and the pressure within case 10. Clearly, when the aircraft descends, and during that portion of the descent in which there is a non-uniform velocity, the mass 40 will tend to move upwardly, thus decreasing the pressure applied to the interior of diaphragm 46, whereby the diaphragm will contract. In the opposite manner, when the aircraft ascends, mass 40 will tend to stay in its position and thus will descend with respect to cylinder 41, thus decreasing the volume at the bottom of the cylinder and causing an increased pressure to be applied to compensating diaphragm 46. Therefore, the diaphragm will expand.

The diaphragm 46 is then provided with an output link 50 which is connected to crank-arm 51 of an auxiliary rocking shaft 52 which is pivotally carried by the schematically illustrated bearings 53 and 54. A shaft 55 is then directly secured to shaft 52 at one end, and to the bearing 24 at the other end thereof.

Accordingly, bearing 23 of rocking shaft 22 and pivotal connection point 60 of arm 21 of the rate diaphragm 15 form an axis around which the compensating movement caused by the movement of bearing 24 takes place. That is to say, it can be readily seen that any movement of bearing 24 around the axis formed by bearings 23 and point 60 will result in a rotation of the sector gear 25 thereby to provide a compensated movement for handstaff 27 and thus pointer 29.

As a further feature of the invention, a capillary outlet 61 is placed on conduit 45 to equalize the pressure resulting from movement of mass or piston 40, where the time factor for capillary 61 is synchronized with the lag of the rate unit. Capillary 61 also tends to nullify the effect of a uniform acceleration such as "g" loadings encountered in turn and bank maneuvers.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. A vertical velocity indicator comprising, in combination, pressure-transducer means for measuring a change in static pressure, indicator means for indicating vertical velocity, linkage means for connecting said pressure transducer means to said indicator means, and compensation means operatively connected to said indicator means; said compensation means including means for measuring vertical acceleration and deceleration of said indicator; said compensation means including auxiliary linkage means connected to said indicator means for adjusting the indication of said indicator means in accordance with the lag of said pressure transducer; said compensation means including an inertial mass, a cylinder for confining said inertial mass, and a second pressure transducer connected in the portion of said cylinder confined by said inertial mass; said second pressure transducer being connected to said auxiliary linkage.

2. The device substantially as set forth in claim 1 wherein said auxiliary linkage is connected to said linkage for varying the transmission of information to said indicator from said pressure transducer.

3. The device substantially as set forth in claim 1 wherein a controlled leak is formed in said confined portion of said cylinder.

4. A vertical velocity indicator comprising a sealed casing, a rate of change of pressure diaphragm and a compensating diaphragm mounted within said sealed casing, an indicating means, and a linkage means connecting said indicating means to said rate of change of pressure diaphragm, a capillary leak opening in said casing, an external static pressure conduit extending into said casing and connected to the interior of said rate of change of pressure diaphragm, and pressure generating means for generating a pressure in accordance with the vertical acceleration or deceleration of said indicator; the pressure generated by said pressure generating means being connected to the interior of said compensating diaphragm; said linkage means being connected to said compensating diaphragm whereby the indication of said indicator means has quick response to changes in vertical altitude.

5. The device substantially as set forth in claim 4 wherein said pressure generating means has a controlled leak extending into the interior of said casing.

6. The device substantially as set forth in claim 5 wherein said pressure generating means includes a piston having a predetermined mass captured for movement within a cylinder; the volume within said cylinder and beneath said piston changing its pressure in response to vertical acceleration and deceleration; said volume being connected to said compensating diaphragm.

References Cited by the Examiner

UNITED STATES PATENTS

| | | | |
|---|---|---|---|
| 2,751,785 | 6/1956 | Fowler et al. | 73—179 |
| 2,973,643 | 3/1961 | Roderick et al. | 73—179 |

LOUIS R. PRINCE, *Primary Examiner.*

D. McGIEHAN, *Assistant Examiner.*